United States Patent
Land et al.

[15] 3,683,770
[45] Aug. 15, 1972

[54] FOLDING CAMERA

[72] Inventors: Edwin H. Land; Alfred H. Bellows, both of Cambridge, Mass.

[73] Assignee: Polaroid Corporation, Cambridge, Mass.

[22] Filed: April 24, 1970

[21] Appl. No.: 29,753

Related U.S. Application Data

[63] Continuation of Ser. No. 655,850, July 25, 1967, abandoned.

[52] U.S. Cl. ............................95/13, 95/32, 95/39
[51] Int. Cl. ..................G03b 17/52, G03b 17/04
[58] Field of Search............95/11, 13, 14, 31, 32, 39, 95/40, 49

[56] References Cited

UNITED STATES PATENTS

| | | | |
|---|---|---|---|
| 621,211 | 3/1899 | Bourrelly | 95/39 |
| 2,880,659 | 4/1959 | Land et al. | 95/39 X |

FOREIGN PATENTS OR APPLICATIONS

| | | | |
|---|---|---|---|
| 687,374 | 2/1953 | Great Britain | 95/11 |
| 345,573 | 3/1921 | Germany | 95/11 |
| 257,458 | 4/1949 | Switzerland | 95/31 |
| 734,237 | 7/1955 | Great Britain | 95/11 |
| 10,121 | 10/1896 | Sweden | 95/40 |

*Primary Examiner*—Samuel S. Matthews
*Assistant Examiner*—Robert P. Greiner
*Attorney*—Brown and Mikulka

[57] ABSTRACT

A compact, folding, self-developing camera including a housing having sections pivotally connected to one another for movement between operative and inoperative positions. On the preferred embodiment, a first housing section holds a film unit in position for exposure, a second housing section has an objective lens, and a mirror for reflecting light from the lens to the film unit is included in a third housing section. The components are constructed so that the axis of the lens intersects the plane of the mirror at an acute angle other, and preferably greater, than 45° when the housing sections are operatively positioned; and when the housing sections are inoperatively positioned, the lens axis is disposed generally perpendicular to a plane containing the mirror and adjacent one end of the mirror and the film unit so that the minimum controlling thickness of the camera is the front-to-rear thickness of the lens.

33 Claims, 8 Drawing Figures

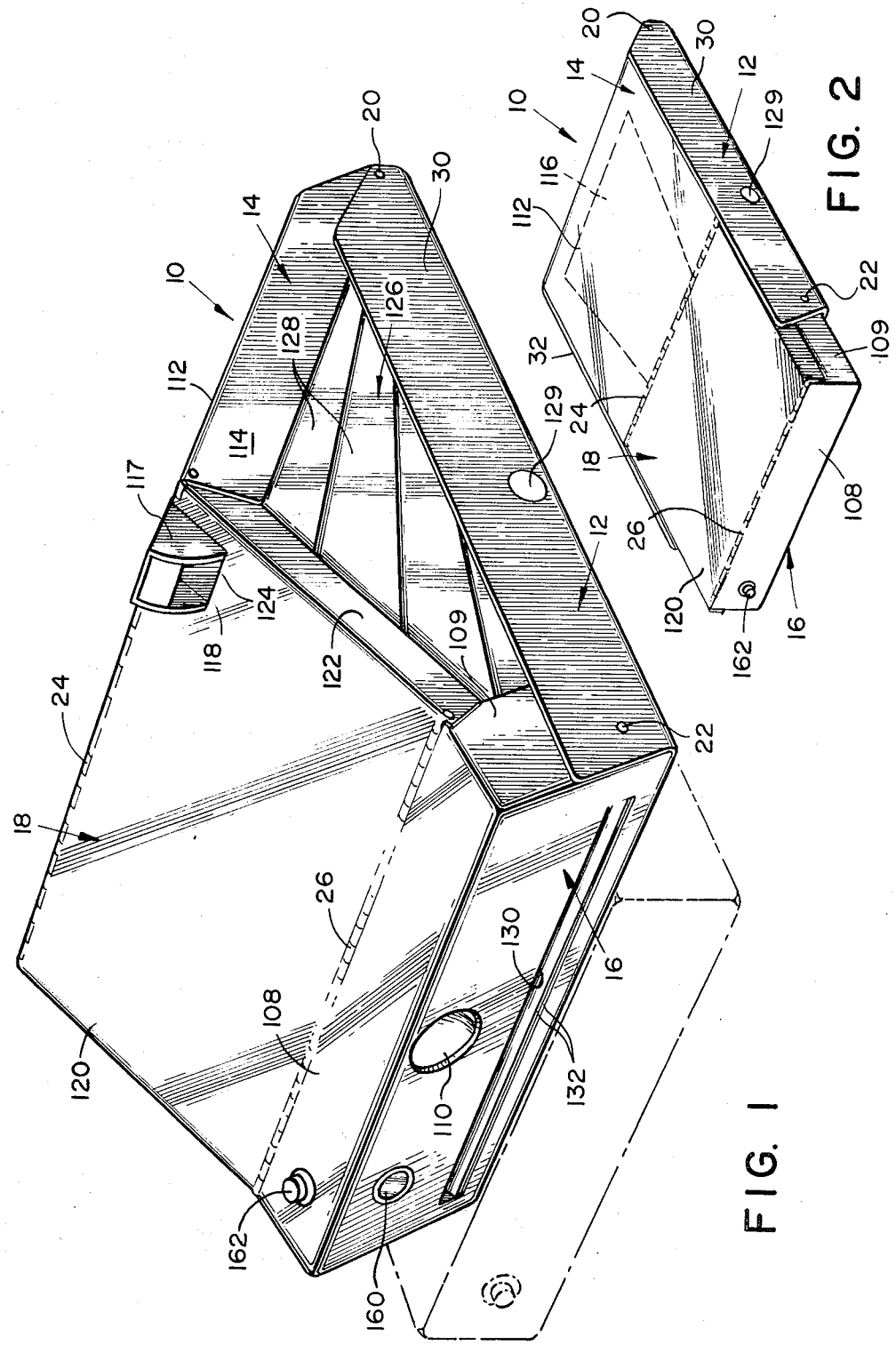

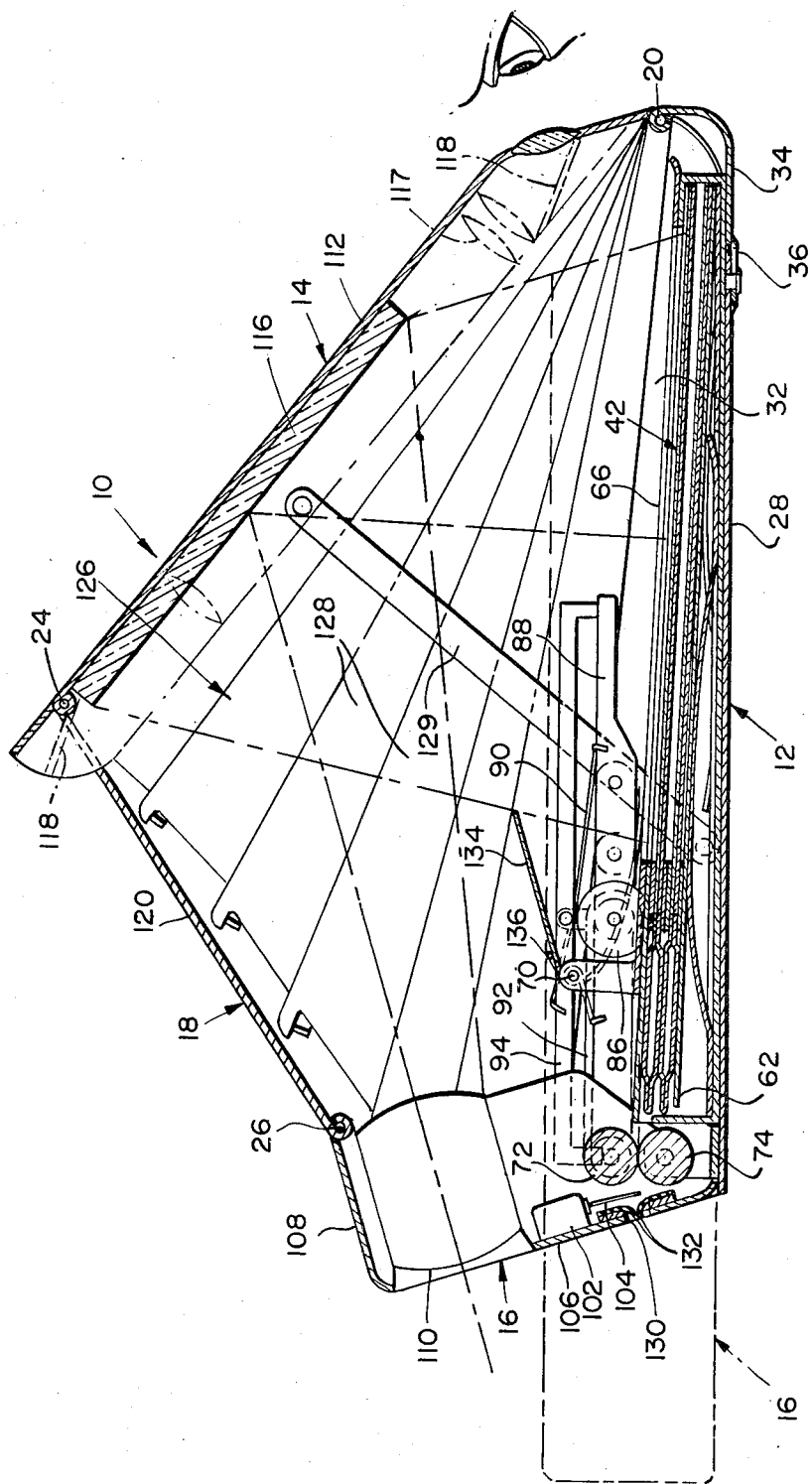

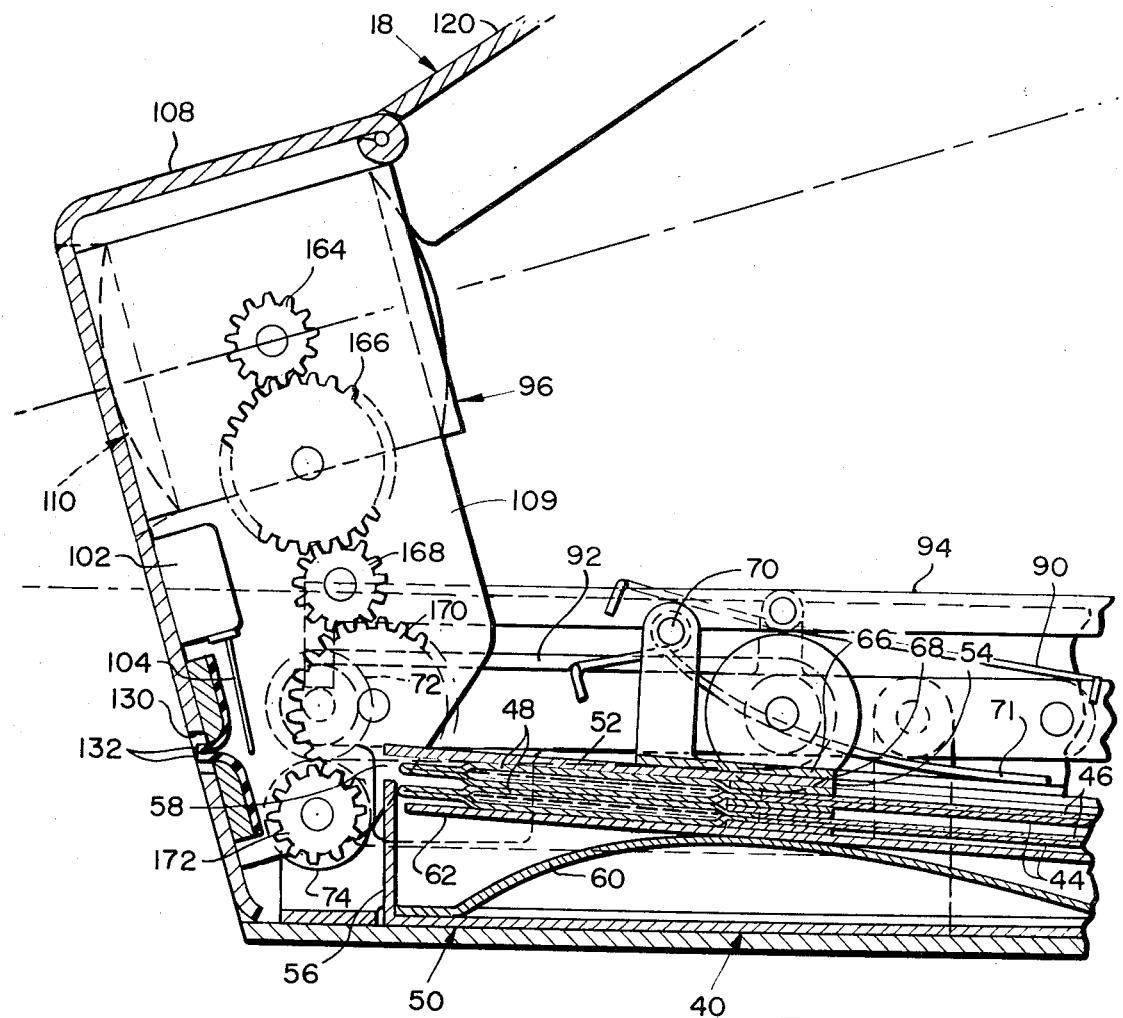

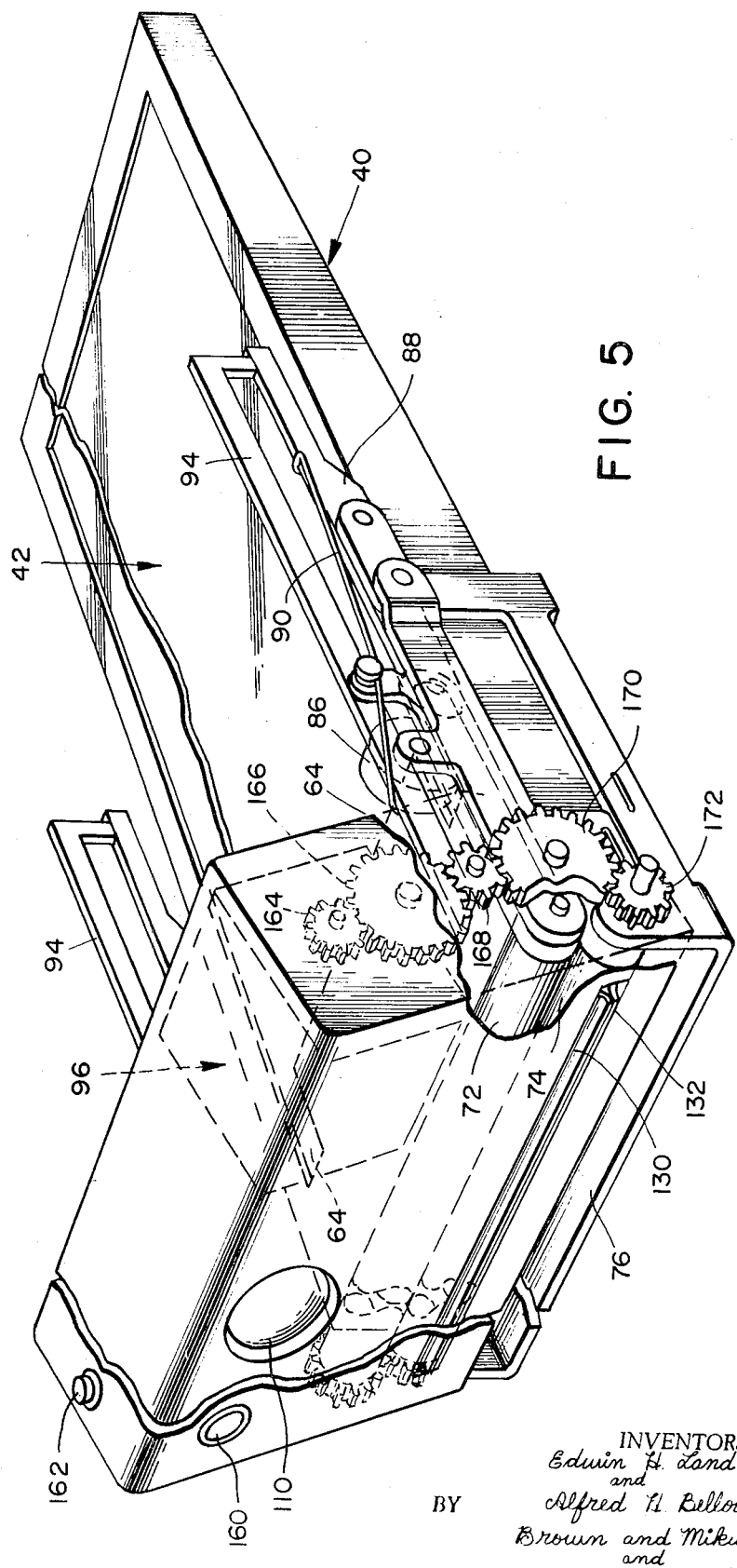

PATENTED AUG 15 1972

INVENTORS
Edwin H. Land
and
Alfred L. Bellows
BY Brown and Mikulka
Robert E. Corb
ATTORNEYS

FOLDING CAMERA

This application is a continuation of the copending application of Edwin H. Land et al. Ser. No. 655,850, filed July 25, 1967, now abandoned.

The present invention is concerned with the construction of a camera including means for holding a plurality of photographic film units, successively positioning the film units for exposure, exposing each film unit and processing each film unit to form a visible image by advancing the film unit between a pair of pressure-applying members to distribute a liquid processing composition within the exposed film unit. The camera is of the type which can be folded from an operative or extended position to a collapsed or transport position to provide an extremely small and compact structure relative to image size, and in view of the volume of the light path between the lens and film unit, the number of film units to be stored and processed and the operations which must be performed by the camera on each film unit to produce a photographic print.

In accordance with the present invention, a novel and exceptionally compact, yet simple and inexpensive camera structure is achieved which, when collapsed or in a transport condition, has a thickness dimension limited to one of the major dimensions, e.g., the front-to-rear thickness, of the objective lens; a width dimension that is only slightly greater than the width of a film unit; and a length dimension that is essentially a function of a length of the film unit plus the smallest dimension of a very compact shutter mechanism. This compactness is largely the result of the novel construction and arrangement of the camera housing and the optical system providing the light path between the lens and film. The camera includes at least two and preferably four relatively movable housing sections with the film-holding means being located in one housing section and the lens and a mirror located either together or separately, in one or two other housing sections. The arrangement of these components is such that, in the operative or extended condition, the axis of the lens intersects the mirror at an acute angle other than 45°, specifically, more than 45° in the case of a four-section camera housing and less than 45° in the case of a two-section camera housing. This construction and arrangement permits the location of the lens fairly close to either the film plane or to the plane of the mirror as compared with the location of the lens equidistant from the mirror and film plane as in the case of conventional cameras in which the mirror is at an angle of 45° with respect to the lens axis and film plane.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a perspective view of the camera constructed in accordance with the invention and shown in an operative or extended condition;

FIG. 2 is a perspective view of the camera illustrated in a folded or transport condition;

FIG. 3 is a sectional view of the camera, the section being taken between the sides of the camera and the camera being illustrated with a film pack in operative position in the camera;

FIG. 4 is an enlarged sectional view similar to FIG. 3 showing a portion of the camera;

FIG. 5 is a perspective view of components of the camera and a film pack;

FIG. 7 is a circuit diagram showing an electrical circuit for controlling the operation of the camera.

Figure 8:
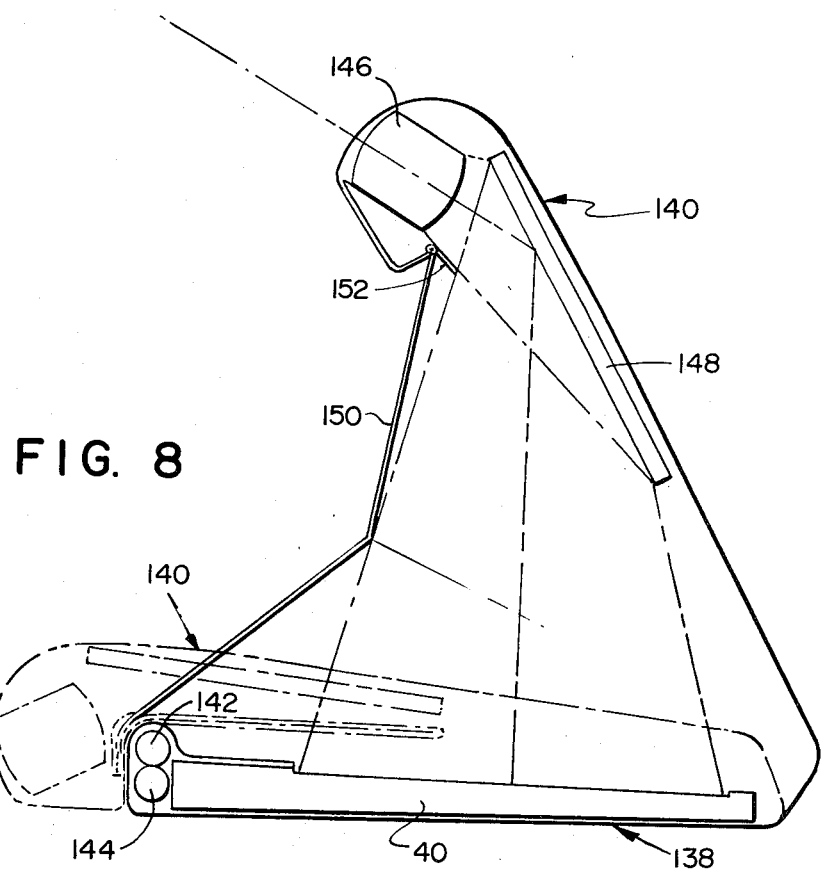
FIG. 8 is a somewhat schematic, sectional view illustrating another embodiment of a camera incorporating the invention.

Reference is now made to FIGS. 1 through 4 wherein there is shown a camera, generally designated 10, comprising a housing including a first section 12, a second section 14, a third section 16, and a fourth section 18. The first housing section 12 may be characterized as the rear housing section and includes means for holding an assemblage or pack of film units with one of the film units located in position for exposure. The first housing section is pivotally connected at one end to one end of second housing section 14 at a hinge 20 and near its opposite end to third housing section 16 at pivots 22, the location of which will be described more fully hereafter. Housing sections 14 and 16 are coupled at hinges 24 and 26 respectively to fourth housing section 18 so that the four housing sections form, in effect, a four-bar linkage which is movable between an extended or operative position (see FIG. 1) in which the housing sections are spaced apart to provide four sides of a chamber, and a folded or transport position (shown in FIG. 2) in which the first and third housing sections are located beside one another substantially in a line and the second and fourth housing sections are located in line with one another and in face-to-face adjacency with the first and third housing sections.

The first housing section 12 essentially comprises a generally rectangular rear wall 28, the dimensions of which are slightly greater than the dimensions of the film pack adapted to be employed in the camera, dependent side walls 30 and 32 and a door 34 pivoted about hinge 20 which is supported at its ends on side walls 30 and 32. Door 34, which forms a part of rear wall 28 and an end wall for the rear housing section, is retained in the closed position by a latch 36 and may be opened to permit loading of a film pack into the camera housing.

The camera is adapted to be employed with film assemblage or film pack 40 including a plurality of film units 42 preferably of the type shown and described in detail in the U.S. patent application of Edwin H. Land, Ser. No. 622,287 and Edwin H. Land et al., Ser. No. 622,286, both filed March 10, 1967, the former application now U.S. Pat. No. 3,615,539, and the latter application now abandoned. Film units of this type each incorporates all of the materials necessary to produce a positive photographic print including a photosensitive element 44, a second or image-receiving element 46 which is transparent and is secured in face-to-face relation with the photosensitive element, and a rupturable container 48 of processing liquid secured to one end of the photosensitive and second elements for dispensing its liquid contents therebetween in response to the application of compressive pressure to the container.

Each film unit is adapted to be processed by advancing the film unit, container foremost, between a pair of pressure-applying members which dispense the liquid contents of the container therefrom between the photosensitive and second elements and spread the liquid between and in contact with the two elements toward the trailing end thereof. The image-forming process is well-known in the art and involves the formation of transferable image-forming substances in the exposed photosensitive element and diffusion of the image-forming substances to another layer within the film unit where they are deposited to form a visible, positive image. In the particular example shown herein and described in the aforementioned applications, the processing liquid includes an opacifying agent which is spread in a layer between the photosensitive element, which is preferably opaque to actinic light, and the transparent image-receiving element 46 for providing a background for the positive transfer image which serves to mask any image formed in the photosensitive element.

Camera size can be reduced and a higher degree of compactness achieved by eliminating the necessity for a processing or imbibition chamber in the camera in which the film unit is advanced and retained in a light-free environment during image formation. Accordingly, the film unit is designed to be advanced from the camera into the light immediately as the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 46 and additionally, a desensitizing agent may be provided in the processing liquid to further insure that the photosensitive element is not exposed to the detriment of the visible image during processing outside of the camera.

A plurality of film units 42 are provided in stacked relation in an opaque container 50 having a forward wall 52 provided with an exposure aperture 54 substantially coextensive in size and shape with the image to be formed and an end wall 56 formed with a slot 58 through which the film units may be moved one at a time. A spring 60 and pressure plate 62 are provided in film pack container 50 behind the film units for supporting the forwardmost film unit in position for exposure against forward wall 52 and in alignment with exit slot 58. Openings 64 are provided in forward wall 52 adjacent the sides thereof and in the region of the containers 48 to enable engagement between the forwardmost film unit and a component of the camera for advancing the leading end of the forwardmost film unit from container 50 through slot 58 following the exposure of the film unit. The film pack is initially supplied with a dark slide (not shown) located between forward wall 52 and the forwardmost film unit 42 so as to cover exposure aperture 54 and prevent the exposure of the film units. The dark slide may be initially the same size as a film unit and can be withdrawn from the film pack through slot 58 in the same manner as the film unit.

As previously indicated, rear housing section 12 includes holding means for positioning film pack 40 in the camera with the forwardmost film unit 42 supported in position for exposure. In the form shown, these holding means comprise a plate 66 formed with a rectangular exposure aperture 68 mounted near its end opposite door 34 for pivotal movement about a pin 70 and biased in a clockwise direction by a torsion spring 71 engaged around pin 70 which urges the end of plate 66 closest door 34, toward rear wall 28 against a stop (not shown) which locates the rear surface of plate 66 slightly forwardly of the focal surface of the camera lens so as to locate the photosensitive element of the forwardmost unit at the focal surface of the lens. Film pack 40 is thicker at the end enclosing containers 48 than it is at the opposite end and the pivotal mounting of plate 66 is provided to enable the introduction of a film pack into the camera through door 34 into the position shown in FIG. 3.

Figure 6:
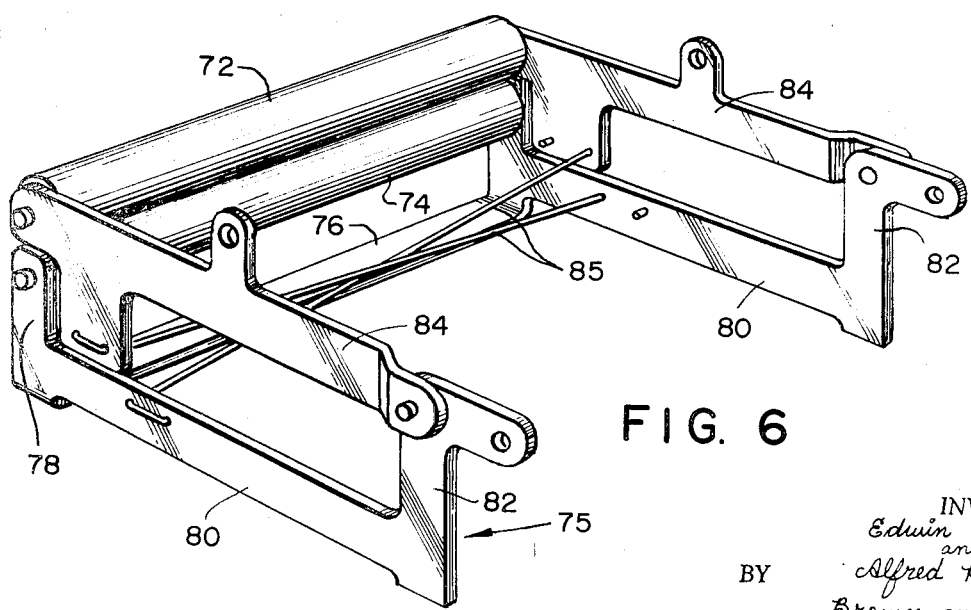
FIG. 6 is an enlarged perspective view of components of the camera.

The first section 12 of the camera housing also includes means for processing each film unit following exposure and in the form shown, these means comprise a pair of rolls 72 and 74 mounted in juxtaposition for rotation about axes located substantially in a plane perpendicular to rear wall 28, with the bite of the rolls located closely adjacent and in substantial alignment with slot 58 in film pack container 50. Means are provided for mounting the rolls in juxtaposition and baising the rolls toward one another so as to apply compressive pressure to a film unit during movement of the film unit between the rolls. In the form shown, these mounting means comprise a frame 75 shown in detail in FIG. 6 and including a transverse member 76 having two forwardly extended arms 78 at its ends in which shafts on the ends of rolls 74 are journaled. A pair of arms 80 extend from the ends of transverse member 76 toward the opposite end of the rear section of the camera housing and include forwardly extended arms 82 on which a pair of levers 84 are pivotally mounted at their ends. Roll 72 is mounted for rotation on the opposite ends of levers 84 and is biased toward roll 74 by a pair of torsion springs 85 each engaged at one end in one of arms 80 and engaged at it opposite end in a portion of one of levers 84.

A drive motor and transmission to be described more fully hereafter are provided for rotation either or both rolls 72 and 74 to advance a film unit between the rolls while applying compressive pressure to the film unit. Means are provided in the rear housing section for feeding the leading edge, (i.e., edge of container 48) of the forwardmost film unit, following the exposure thereof, through slot 58 into the bite of rolls 72 and 74 so that the latter may engage, advance, and process a film unit. These last-mentioned feeding means are illustrated as comprising a pair of friction rolls 86 each mounted on one end on a lever 88 in position to engage the forwardmost film unit through openings 64 in forward wall 52 of a film pack container 50. Levers 88 are pivotally mounted intermediate their ends on frame 75 and are biased by torsion springs 90 so as to urge friction rolls 86 rearwardly into engagement with a film unit. Rolls 86 are designed to be rotated in engagement with the forewardmost film unit to advance it into the bite of rolls 72 and 74 and for this purpose, are driven from roll 72 by an endless flexible drive coupling such as an O-ring 92. Rolls 86 are rotated during the rotation of rolls 72 and 74 and provision is made for disengaging rolls 86 from the film unit as soon as the leading edge portion of the film unit becomes engaged between rolls 72 and 74 and thereby prevent the movement of the next succeeding film unit into the bite of the pressure rolls during processing of the preceding film unit. These last-mentioned means include a pair of levers 94 each pivotally mounted intermediate its ends with one end engaged with a shaft on the end of roll 72 and the other end engaged with the end of lever 88 opposite roll 86 for pivoting lever 88 in a clockwise direction to disengage roll 86 from the forwardmost film unit as roll 72 is displaced forwardly relative to roll 74 and frame 75 as a film unit enters the bite of rolls 72 and 74. The pivotal mounting shown multiplies the motion of rolls 86 to provide for a relatively large displacement of rolls 86 in response to a relatively small displacement of roll 72.

Rolls 72 and 74 are preferably driven by an electrically operated motor housed within one of the sections of the camera housing, coupled with roller 74 through a suitable transmission which will be described more fully hereafter, and powered by a battery (not shown) also housed within one of the sections of the camera housing, for example, mounted on door 34 so as to be located between the door and the end of film pack 40. The circuit for controlling the operation of the motor is illustrated in FIG. 7 as as including the motor 96, a battery 98, and first and second switches 100 and 102 connected in parallel with one another and in series with the motor and battery. First switch 100 is manually actuated to energize motor 96 which drives rollers 72 and 74 and friction rolls 86. Switch 100 is preferably of the type which closes only momentarily, preferably for a time sufficient to feed the leading end of a film unit into the bite of rolls 72 and 74 which, in turn, advance the film unit beyond the friction rolls into the engagement with the operating lever 104 of a second switch 102 thereby closing the second switch which keeps motor 96 energized as long as a film unit is engaged with the operating lever to insure operation of the motor and advancement of a film unit completely between rolls 72 and 74. After the trailing edge of the film unit has been advanced completely between the pressure rolls past the operating lever 104 of switch 102, the latter will open disconnecting the motor from battery 98 and terminating the processing cycle. Switch 100 may be incorporated in the shutter mechanism of the camera and coupled with a manually operable shutter actuating element such as a shutter release button 162 so as to initiate a processing cycle immediately following exposure of a film unit. It is anticipated that the processing cycle for each film unit may require on the order of one-third of a second thus making the operation of the camera semi-automatic and enabling the operator to make exposures and process the exposed film units at the relatively rapid rate of three per second and because the friction feed rolls 86 are displaced from engagement with a film unit during movement of a film unit between the processing rolls it is impossible to advance in process two film units at a time.

Third housing section 16 is generally parallelepiped shaped, is engaged between side walls 30 and 32 of first housing section 12 and is pivotable with respect to the first housing section about the axis of processing roll 74. The third housing section includes an outer wall 106 which, in the folded position of the camera housing, is disposed in essentially the same plane as rear wall 28 and in the operative position of the camera housing, functions as the forward wall of the camera; and an outer wall 108 which in the folded position of the camera constitutes an end wall of the camera and in the operative position of the camera housing sections functions as one of the upper walls of the camera housing. The third housing section also includes side walls 109 engaged between side walls 30 and 32 of the rear housing section. A conventional photographic objective lens 110 is mounted within third housing section 16 with the lens axis disposed perpendicularly to outer or forward wall 106 so that light transmitted through the lens along the lens axis is directed, in the operative position of the camera housing, away from and at an an acute angle with respect to the forwardmost film unit; and in the folded position of the camera housing, the axis of lens 110 extends approximately perpendicularly to planes containing the rear wall 28 and the film units. It will be noted that when the camera is folded, the minimum controlling thickness of the camera is the front-to-rear thickness of lens 110.

Second housing section 14 comprises an outer wall 112 pivotally connected at one end via hinge 20 to rear housing section 12, and dependent side walls 114 engaged between side walls 30 and 32 of the rear housing section. A substantially planar and preferably front surface, mirror 116 is mounted on the inside of wall 112 for reflecting light from lens 110 toward a film unit positioned for exposure in the rear housing section. The acute angle at which the axis of lens 110 intersects mirror 116 in the operative position of the camera housing is greater than 45° thus making it possible to locate lens 110 relatively closer to the focal plane of the lens, i.e., plane of the photosensitive element of the foremost film unit, than to the mirror and asymmetrically with respect to the focal plane thus providing for a smaller structure when the camera housing is extended in its operating position and the relatively thin compact structure previously described when the camera is folded and the housing sections are in a transport condition.

The camera includes a conventional view finder, generally designated 117, mounted within the second housing section adjacent one side of mirror 116 and including entrance and exit apertures provided with mirrors 118 at opposite ends of the second housing section.

Third housing section 16 incorporates a shutter mechanism (not shown) which may include a photocell 160 and a button 162 for releasing the shutter to make an exposure and closing switch 100 to initiate a processing cycle. Drive motor 96 for processing rolls 72 and 74 is also incorporated in the third housing section and is coupled with processing roll 74 via a speed-reducing transmission including gears 164, 166, 168, 170, and 172. The drive motor is preferably of a low torque, very high speed type requiring the reduction gears to provide the torque at rolls 72 and 74 necessary to advance each film unit between the rolls at the proper speed.

Fourth housing section 18 comprises an outer wall 120 pivotally connected at one side to outer wall 112 of second housing section 14 at hinge 24 and along its opposite side to wall 108 of third housing section 16 at hinge 26, and dependent side walls 122 engaged between side walls 114 of the second housing section and outside of the ends of third housing section 16 so that in the folded position of the camera housing, the second and fourth housing sections are located between side walls 30 and 32 of the first housing section and the side walls of the fourth housing section are located between the side walls of the second housing section. Wall 120 includes an opening 124 for receiving the forward end of the view finder 117 when the camera housing is folded, in which position wall 120 appears as an extension of wall 112 of the second housing section.

The fourth housing section functions essentially as a connection between the second and third housing sections, and as one side of a chamber providing a light path between lens 110 and a film unit positioned for exposure. The two remaining sides of this chamber in addition to those provided by the housing sections are each formed by fan-like bellows 126 of the type shown and described, for example, in the copending U.S. patent application of Irving Erlichman, Ser. No. 655,859, filed on July 25, 1967, and now Pat. No. 3,479,941. Each of these bellows comprises a plurality of interlocking blades 128 all pivoted about a single axis and covered at their ends and along the sides of the two outermost blades by side walls 30, 109, 114, and 122. Blades 128 have generally U-shaped cross sections, are adapted to telescope into one another and are more fully described in the aforementioned Erlichman application. The camera also includes means, described in greater detail in the Erlichman application, for retaining the camera housing in an operative or erect position and in the form shown, these means include a rigid link 129 pivoted at one end on second housing section 14 engaged for pivoting and sliding movement at its other end on first housing section 12. A detent (not shown) coupled with a manually operable button is provided on the first housing section for engaging the end of link 129 to retain the latter against movement and thereby secure the housing sections in the erect position shown in FIG. 3.

The third housing section provides the forward wall of the camera, (i.e., the wall facing the subject), when the latter is in an operative condition, and for preventing light from being admitted into the camera housing in the region of processing rolls 72 and 74. Film units, as they are processed, are advanced directly from the camera into the light and accordingly, outer wall 106 of the third housing section is formed with an opening 130 for passing the film units. A pair of flexible convergent lips 132 are mounted on the inside of wall 106 between the latter and the processing rolls to provide a lighttight passage through which successive film units may be advanced from the camera and prevent the admission of light into the camera. Lips 132 may also function to grip and hold the trailing end of each film unit and prevent it from falling until the operator can grasp the film unit.

A baffle 134 is pivotally mounted within and on rear housing section 12 and is pivotally biased in a clockwise direction against a stop into the operative position shown in FIG. 3 in which the baffle prevents exposure of the photosensitive element by off-axis light transmitted by the lens. When the camera housing is folded, the baffle is engaged by means on the second housing section for pivoting it in a clockwise direction to enable the housing to be completely folded.

Another embodiment of the camera is illustrated in FIG. 8 in which the axis of a lens intersects the mirror at an acute angle less than 45° and asymmetrically with respect to the mirror thereby making it possible to locate the lens closely adjacent an edge of the mirror and relatively far from the focal plane of the lens when the camera is in an erect and operative position. In the form shown, this camera includes a rear housing section 138 and a forward housing section 140 pivotally coupled at one end for movement between a closed position in which the two housing sections are in face-to-face relation and an open position at which the housing sections are disposed at an acute angle. Rear housing section 138 includes means for holding a film pack 40 and a pair of processing rolls 142 and 144 and the forward housing section enclosed an objective lens 146 and a mirror 148. The two housing sections are coupled to one another by a folded bellows 150 which cooperates with the housing sections to provide a lighttight chamber within which light is transmitted from lens 110 via mirror 148 to a film unit in position for exposure within pack 40 held in the rear housing section. The other operating components including a baffle 152, a drive system for rollers 142 and 144 and means (not shown) for feeding the film units into the bite of the processing rolls, and these components may be substantially the same as described in connection with the embodiment previously illustrated.

It will be appreciated from the foregoing description a camera constructed in accordance with the invention, namely, a folding camera including a lens and mirror in which the lens axis intersects the mirror at an acute angle other than 45°, is characterized by a small size compactness and small overall volume in relation to image size that is impossible with structures in which the mirror and lens axis intersect at a 45° angle at a point symmetrical with respect to the mirror and/or focal plane. This particular disposition of the lens axis relative to the mirror enables the lens to be located much more closely to the film plane or the mirror than would otherwise be possible in the operative position of the camera and asymmetrically with respect thereto while contributing to a more compact structure in the folding condition. The specification has disclosed a self-developing camera having four relatively movable housing sections which is so compact that the minimum limiting thickness is the front-to-rear dimension of the lens rather than space required by the many other components needed to house a film pack and successively expose and process the plurality of film units comprising the film pack.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera comprising, in combination:
   holding means for supporting a photosensitive element in position for exposure;

an objective lens for forming an image at a photosensitive element positioned for exposure by said holding means;

a mirror for reflecting light transmitted by said lens toward said photosensitive element; and means for mounting said holding means, said lens and said mirror for movement relative to one another between an extended position in which the axis of said lens intersects the plane of said mirror at an acute angle other than 45° and said mirror is located at an angle with respect to a photosensitive element positioned for exposure by said holding means, and a folded position in which said mirror is located in adjacent, face-to-face relation with said photosensitive element.

2. A camera is defined in claim 1 wherein said lens axis, in said extended position, intersects said plane of said mirror at an acute angle greater than 45°.

3. A camera as defined in claim 2 wherein said lens, in said extended position, is located substantially closer to an edge of the image formed thereby at said photosensitive element positioned by said holding means than to said mirror.

4. A camera as defined in claim 3 wherein said holding means supports said photosensitive element substantially in a plane, said axis of said lens, in said extended position, extends toward said mirror away from said photosensitive element at an acute angle with respect to said plane of said photosensitive element, and in said folded position, said angle between said axis and said plane is greater than in said extended position.

5. A camera comprising, in combination:
holding means for supporting a photosensitive element in position for exposure;
an objective lens for forming an image at a photosensitive element positioned for exposure by said holding means;
a mirror for reflecting light transmitted by said lens toward said photosensitive element; and
means for mounting said lens and said mirror in relative positions such that the axis of said lens intersects the plane of said mirror at an angle less than 45°.

6. A camera as defined in claim 5 wherein said lens is mounted adjacent an edge of said mirror.

7. A camera as defined in claim 6 wherein said holding means supports said photosensitive element substantially in a plane and said lens is positioned to direct light along said axis toward said mirror and said plane of said photosensitive element at an acute angle with respect thereto.

8. A camera comprising, in combination:
holding means for supporting a photosensitive element in position for exposure;
an objective lens for forming an image at a photosensitive element positioned for exposure by said holding means;
a mirror for reflecting light transmitted by said lens toward said photosensitive element;
means for mounting said lens and said mirror in relative positions such that the axis of said lens intersects the plane of said mirror at an acute angle other than 45°; and
first and second housing sections movable relative to one another between operative and inoperative positions;
said holding means being mounted on said first section, said mirror being mounted on said second section, and said mirror and said lens being positioned relative to one another as defined when said housing sections are in said operative position.

9. A camera as defined in claim 8 including:
a pair of rolls mounted for rotation in juxtaposition adjacent said holding means within said first housing section;
means for rotating at least one of said rolls to advance a film unit, including a photosensitive element positioned for exposure by said holding means, from said holding means between said rolls to distribute a liquid processing composition in contact with said photosensitive element; and
means defining a passage in said second housing section located, in said operative position of said housing sections, in alignment with said rolls for enabling the movement of said film unit between said rolls from said camera.

10. A camera as defined in claim 8 including viewfinder mounted within said second housing section and providing a light path extending within said second housing section from end to end thereof in a direction generally parallel with said plane of said mirror to the other end of said second housing section.

11. A camera as defined in claim 8 wherein said housing sections are coupled for pivotal movement with respect to one another between said operative and inoperative positions and said mirror is displaced toward said holding means by pivotal movement of said housing sections from said operative position to said inoperative position.

12. A camera comprising, in combination:
holding means for supporting a photosensitive element in position for exposure;
an objective lens for forming an image at a photosensitive element positioned for exposure by said holding means;
a mirror for reflecting light transmitted by said lens toward said photosensitive element; and
means for mounting said lens and said mirror in relative positions such that the axis of said lens intersects the plane of said mirror at an acute angle other than 45°;
a first housing section supporting said holding means;
a second housing section supporting said mirror and pivotally coupled with said first housing section near the ends of said sections furthest from said lens;
a third housing section mounting said lens and pivotally coupled with said first housing section near the opposite end thereof; and
a fourth housing section pivotally coupled between said second and third housing sections;
said housing sections being pivotable between an inoperative position in which said mirror and said holding means are located adjacent one another and an operative position wherein said mirror and said lens are positioned relative to one another as defined and said housing sections cooperate to define walls of a chamber providing a light path between said lens and said holding means.

13. A compact folding camera comprising in combination:
a first housing section;

holding means for supporting a photosensitive element in position for exposure mounted on said first housing section;

a second housing section pivotally coupled with said first housing section near one end thereof;

a substantially planar mirror mounted on said second housing section;

a third housing section pivotally coupled with said first housing section near the other end thereof;

an objective lens for forming an image at a photosensitive element positioned for exposure by said holding means, mounted on said third housing section;

said housing sections being pivotable with respect to one another between an inoperative position in which said mirror faces and is located adjacent said holding means and an operative position in which said mirror and said holding means are spaced from one another and the axis of said lens intersects the plane of said mirror at an acute angle.

14. A camera as defined in claim 13 wherein said axis of said lens intersects said plane of said mirror at an angle greater than 45° in said operative position of said housing sections.

15. A camera as defined in claim 14 wherein said holding means support a photosensitive element substantially in a plane and said lens is positioned to direct light along said axis toward said mirror away from the photosensitive element at an acute angle with respect to said plane of said photosensitive element when said housing sections are in said operative position.

16. A camera as defined in claim 14 wherein said third housing section is pivotable to an inoperative position in which said lens is disposed with said axis generally perpendicular to a plane containing said photosensitive element positioned for exposure by said holding means.

17. A camera as defined in claim 13 including a fourth housing section pivotally coupled between said second and third housing sections for cooperating therewith, when said housing sections are in operative position, to position said lens and mirror relative to one another as defined and to define walls of a chamber providing a light path between said lens and said holding means.

18. A compact folding camera including housing sections movable relative to one another between operative and inoperative positions and an objective lens, the front-to-rear thickness of which is the controlling thickness of said camera in said inoperative position of said housing sections, said camera comprising in combination: a first housing section;

holding means for supporting a photosensitive element substantially in a plane in position for exposure, mounted within said first housing section;

a second housing section pivotally coupled with said first housing section near one end thereof;

an objective lens for forming an image at a photosensitive element, positioned for exposure by said holding means, mounted within said second housing section;

a third housing section pivotally coupled with said first housing section near the other end thereof; and a mirror mounted within said third housing section for reflecting light form said lens toward said holding means;

said housing sections being arranged in said inoperative position thereof with said first and second housing sections disposed end to end with the axis of said lens located generally perpendicular to the plane of a photosensitive element positioned by said holding means and said third housing section located with said mirror in face-to-face adjacency with said holding means;

said housing sections in said operative position thereof being located such that said axis of said lens intersects said mirror at an acute angle greater than 45°.

19. A camera as defined in claim 18 including:

a pair of rolls mounted for rotation in juxtaposition within said first housing section at said one end thereof adjacent said holding means;

means for rotating at least one of said rolls to advance a film unit, including a photosensitive element positioned for exposure by said holding means, from said holding means between said rolls to distribute a processing liquid in contact with said photosensitive element; and means defining a passage in said second housing section located, in said operative position of said housing sections, in alignment with said rolls for enabling the movement of said film unit between said rolls from said camera.

20. A compact self-developing camera including an objective lens for forming an image at an exposure plane, said camera comprising, in combination:

a housing for mounting and enclosing the components of said camera;

said housing including a base section including means for supporting a photosensitive element in position for exposure at said exposure plane and a forward section located at one end of said base section;

exposure means housed within said forward section and including an objective lens mounted with the optic axis thereof at an acute angle to said exposure plane;

said forward section including an opening for passing a photosensitive element;

processing means contained, at least partially, within said forward section adjacent said opening for applying compressive pressure to a photosensitive element while moving said photosensitive element through said opening;

means within said base section for advancing a photosensitive element from exposure position into engagement with said processing means;

said housing including an intermediate section providing an enclosed light path between said forward section and said base section, said intermediate section including a first wall extending from the other end of said base section at an acute angle with respect to said exposure plane; and a mirror mounted within said housing on said first wall and having a substantially plane reflecting surface intersecting said optic axis at an acute angle other than 45° for reflecting light from said lens toward said exposure plane.

21. A self-developing camera as defined in claim 20 wherein said processing means are constructed and positioned to move said photosensitive element through said opening in a plane at least generally parallel with said exposure plane and intersecting said optic axis of said lens outside of said camera.

22. A self-developing camera as defined in claim 20 wherein said mirror is located with the geometric center of said reflective surface substantially at said optic axis.

23. A self-developing camera as defined in claim 20 wherein said intermediate section includes a second wall coupled between and to said first wall and said forward section.

24. A self-developing camera as defined in claim 23 wherein said housing sections including said first and second walls are coupled for pivotal movement with respect to one another between folded and operative positions.

25. A compact folding camera comprising, in combination:
 a housing including at least first and second sections defining sides of a lighttight chamber for transmitting light to a photosensitive element positioned within said housing;
 pivot means pivotally connecting said housing sections to one another near ends thereof for movement between a folded position and an extended position, said housing sections defining an acute angle with respect to each other in said extended position;
 means within said first section for positioning a photosensitive element for exposure;
 means within said chamber on said second section for directing light toward a photosensitive element positioned for exposure within said first section;
 linkage means providing, at least in said extended position, a rigid link coupled to said first and second sections at locations thereon remote from said pivot means and cooperating with said sections when in said extended position to form a rigid triangle;
 a third section defining another side of said chamber, said third section being pivotally coupled with said first section at a position remote from said pivot means;
 exposure means mounted within said third section for admitting light to said chamber; and
 a member pivotally coupled to said second housing section at a position remote from said pivot means and to said third section for supporting said third section in fixed relation to said first and second sections in said extended position.

26. A compact folding camera comprising:
 a first section having means therein for positioning a photosensitive element at a film plane for exposure;
 a mirror in said camera for reflecting light from a scene onto said film plane;
 lens means for directing light from a scene into said camera;
 a second section having means for positioning said mirror with its reflective surface in a reflecting plane such that the position of said reflecting plane is determined by the position of said second section;
 means interconnecting said first and second sections to permit relative movement of said sections between a folded position in which said reflecting plane and said film plane are substantially parallel with each other and an extended position in which said reflecting plane forms an acute angle other than 45° with said film plane;
 means for releasably securing said first and second sections in said extended position; and
 means for positioning said lens means such that when said first and second sections are in the extended position, said lens means lies within the acute angle formed by said reflecting plane and said film plane, with the optic axis of said lens means oriented to direct scene light onto said reflecting plane.

27. A compact folding camera comprising:
 at least four body sections each having at least one primary exterior planar surface forming a part of the exterior of the body of said camera at all times;
 means pivotally coupling said sections to each other near their ends in series fashion to form a closed loop and to permit movement of said four sections relative to each other between a folded position in which said planar surfaces of said sections are substantially parallel to each other and an extended position in which each of said planar surfaces forms an angle with the planar surfaces of the two adjacent pivotally coupled sections;
 lens means in one of said sections for admitting scene light to the camera;
 film-supporting means in another of said sections for positioning a photosensitive element for exposure; and
 extensible light sealing means forming a lighttight enclosure with said four sections.

28. A compact photographic camera of the self-developing type comprising:
 a first section having means therein for positioning a photosensitive element at a film plane for exposure;
 processing means mounted adjacent one end of said film plane, said processing means being adapted to engage a photosensitive element and move the latter toward the exterior of said camera;
 a mirror in said camera for reflecting light from a scene onto said film plane;
 lens means for directing light from a scene into said camera;
 a second section having means for positioning said mirror with its reflecting surface oriented in a preselected reflecting plane;
 said first and second sections being oriented in relation to each other such that an acute angle of less than 45° is formed between said film plane and said reflecting plane;
 a third section supporting said lens means within the acute angle formed by said film plane and said reflecting plane with the optic axis of said lens means oriented to direct scene light onto said reflecting plane;
 means blocking the direct transmission of scene light through said lens means onto said film plane;
 means interconnecting said first, second and third sections to form a lighttight enclosure; and
 means for moving the photosensitive element into engagement with said processing means.

29. A compact photographic camera as defined in claim 28 further including a fourth section extending between said second and third sections such that said four sections form in combination a compact four element body and said interconnecting means connects said four sections to form in combination therewith a lighttight enclosure.

30. A folding photographic camera extendable from a generally flattened configuration to an operative extended configuration preparatory to the making of a photographic exposure comprising:
an articulated frame including at least four frame sections and means articulating each frame section to adjacent frame sections to form a four-sided assembly having variable included angles near each extremity thereof to permit said articulated frame to be folded flat with two of said frame sections substantially coplanar and parallel to a plane containing the other two frame sections;
means in one of said frame sections for positioning a photosensitive element at a focal plane of said camera; and
optical means including lens means in another of said frame sections for imaging a subject at said focal plane.

31. The folding photographic camera of claim 30 wherein said optical means comprises a mirror pivoted adjacent one end of said focal plane and wherein the other of said frame sections mounting said lens means is located at the opposite end of said focal plane to project an image onto said focal plane by reflection from said mirror.

32. A compact photographic camera of the self-developing type comprising:
a housing;
means within said housing for positioning a photosensitive element at a focal plane of said camera;
processing means mounted adjacent one end of said focal plane;
a mirror;
means for positioning said mirror at the other end of said focal plane oriented at an angle of less than 45° thereto;
a photographic objective;
means for positioning said photographic objective near said one end of said focal plane with its optical axis inclined at an angle of less than 45° to said focal plane and diverging therefrom to direct a focused image from said objective onto said focal plane by reflection from said mirror; and
means for moving the photosensitive element into engagement with said processing means.

33. A compact folding camera comprising:
at least four frame sections;
means pivotally coupling said frame sections to each other near their ends in series fashion to form a closed loop and to permit movement of said frame sections relative to each other between a folded position in which said frame sections are nested together in two sets of pairs, which sets are adjacently positioned in substantially parallel relationship to each other, and an extended position in which said frame sections form a four element body having included angles at each junction of said sections;
lens means in one of said frame sections for admitting scene light to the interior of said four sided body;
film-supporting means in another of said frame sections for positioning a photosensitive element for exposure; and
extensible light sealing means forming a lighttight enclosure with said frame sections.

* * * * *

Disclaimer 3,683,770.—*Edwin H. Land* and *Alfred H. Bellows*, Cambridge, Mass. FOLDING CAMERA. Patent dated Aug. 15, 1972. Disclaimer filed, Apr. 5, 1976, by the assignee, *Polaroid Corporation*.

Hereby enters this disclaimer to claims 1–4, 8, 11–18, 27, 30, 31 and 33 of said patent.

[*Official Gazette June 1, 1976.*]